(12) United States Patent
Gray (10) Patent No.: US 6,726,282 B2
(45) Date of Patent: Apr. 27, 2004

(54) SEAT ADJUSTMENT AND DUMPING SYSTEM WITH CABLE SPOOL MEMORY

(75) Inventor: Larry Gray, Westfield, IN (US)

(73) Assignee: Porter Engineered Systems, Indianapolis, IN (US)

( * ) Notice: Subject to any disclaimer, the term of this patent is extended or adjusted under 35 U.S.C. 154(b) by 64 days.

(21) Appl. No.: 09/929,646

(22) Filed: Aug. 14, 2001

(65) Prior Publication Data

US 2003/0034683 A1 Feb. 20, 2003

(51) Int. Cl.⁷ .................................................. B60N 2/20
(52) U.S. Cl. ............................ 297/378.12; 297/362.12; 297/374
(58) Field of Search ..................... 297/378.1, 378.12, 297/361.1, 362.12, 362.14, 362.11, 362.13, 375, 374

(56) References Cited

U.S. PATENT DOCUMENTS

| | | | |
|---|---|---|---|
| 4,573,738 A | | 3/1986 | Heesch |
| 4,685,736 A | | 8/1987 | Tanaka et al. |
| 4,687,250 A | | 8/1987 | Esche |
| 5,306,073 A | | 4/1994 | Rees |
| 5,393,123 A | * | 2/1995 | Hernandez et al. .... 297/378.12 |
| 5,433,507 A | | 7/1995 | Chang |
| 5,628,470 A | | 5/1997 | Ray et al. |
| 5,788,330 A | * | 8/1998 | Ryan ..................... 297/378.12 |
| 5,794,470 A | | 8/1998 | Stringer |
| 5,806,932 A | | 9/1998 | Zhuang |
| 5,823,622 A | * | 10/1998 | Fisher et al. ........... 297/362.12 |
| 5,979,986 A | * | 11/1999 | Pejathaya .............. 297/362.12 |
| 6,007,153 A | | 12/1999 | Benoit et al. |
| 6,095,609 A | * | 8/2000 | Magadanz ............. 297/378.12 |
| 6,106,067 A | | 8/2000 | Zhuang et al. |
| 6,315,361 B1 | * | 11/2001 | Stone et al. ........... 297/362.12 |

FOREIGN PATENT DOCUMENTS

DE  195 23 254 A1  1/1997

OTHER PUBLICATIONS

Copy of International Search Report for International Application No. US02/25707 completed on Dec. 16, 2002.

* cited by examiner

Primary Examiner—Anthony D. Barfield
(74) Attorney, Agent, or Firm—Baker & Daniels (57) ABSTRACT

An adjustment mechanisms suited for vehicle seats, and particularly mechanisms that include a memory feature. The inventive adjustment system is of the type that provides a method of selecting a preferred seat position, releasing the adjustment mechanism for free movement of the seat, and automatically arresting the adjustment mechanism, securing the seat at the selected position. In the case of some prior art seat adjustment mechanisms, using the recline adjustment control to dump the seat does not allow the passenger to automatically return the seat back to the selected position. Other prior art seat adjustment mechanism separate the recline adjustment and the dump controls but rely upon relatively bulky stamped metal components to capture and latch the seat after dumping. The present invention uses a take-up reel and flexible cable assembly to set and retain a selected seat position and to re-engage the same locking mechanism for both recline adjustments and dumping, eliminating the need for stamped or machined metal components that can be bulky, heavy, expensive, and difficult to manufacture and assemble.

19 Claims, 9 Drawing Sheets

SEAT ADJUSTMENT AND DUMPING SYSTEM WITH CABLE SPOOL MEMORY

BACKGROUND OF INVENTION

The present invention relates to adjustment mechanisms suited for vehicle seats, and particularly mechanisms that include a memory feature. The inventive adjustment system is of the type that provides a means of selecting a preferred seat position, releasing the adjustment mechanism for free movement of the seat, and automatically arresting the adjustment mechanism, securing the seat at the selected position.

One typical use for this type of seat adjustment mechanism is for the front seat of a two-door passenger vehicle. In such a vehicle, the seat backs of the front seats are adjustable. By the simple expedient of a hand lever, a passenger can adjust the angle of incline of the seat back to a selected position of comfort. In many vehicles, the seat back can be adjusted from a substantially vertical orientation to a nearly horizontal, reclined position.

When passengers enter the rear seat of a two-door vehicle, it is often necessary to pivot the seat back of the front seat forward to allow easy access to the rear of the vehicle. This process is known as "dumping" the front seat. In some seat designs, the dumping process occurs by manipulating the same lever that is used to adjust the incline of the seat back. This approach is simple, but it does not allow the passenger to easily restore the seat back to a selected position.

Figure 2A:
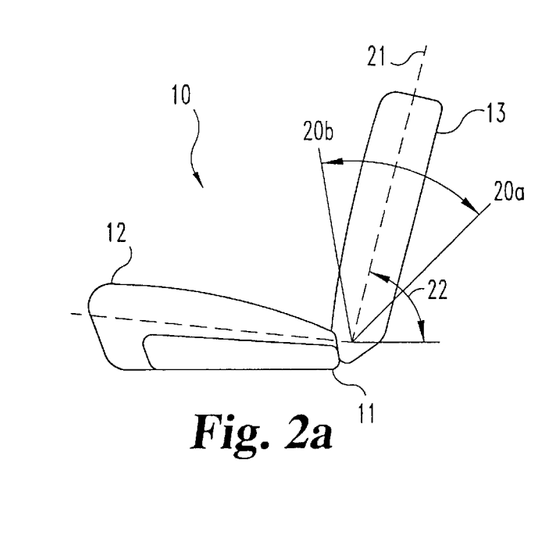
Figure 2B:
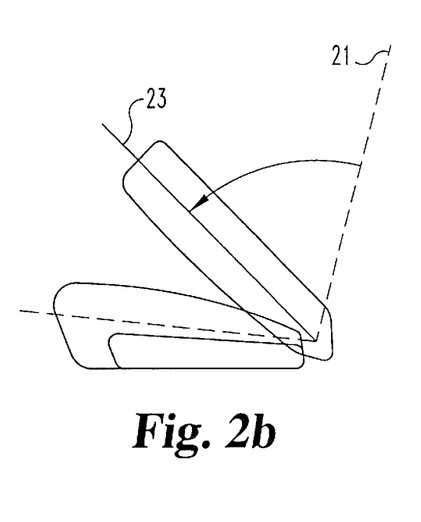
Figure 2C:
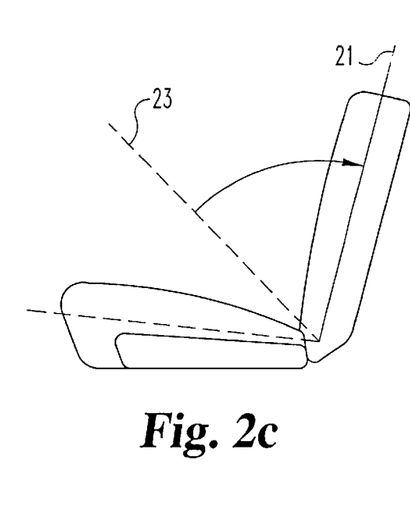

This process is shown schematically in FIGS. 2(a)–(c). Specifically, a seat assembly 10 is connected to the vehicle body by way of a support frame 11. The seat back 13 can be adjusted in either direction through a range of adjustment 20a to 20b relative to the seat bottom 12 and the support frame 11. As shown in FIG. 2(a), the passenger can adjust the seat back to a selected seat position 21, corresponding to an angle of inclination 22. However, when a passenger desires access to the rear of the vehicle, pivoting the seat forward as depicted in FIG. 2(b) dumps the seat back 13 from its selected seat position 21, to its dumped position 23.

In the case of some prior art seat adjustment mechanisms, using the recline adjustment to dump the seat does not allow the passenger to automatically return the seat back to the selected seat position 21, as shown in FIG. 2(c). As a result, more sophisticated systems have been developed.

One such system separates the seat recline feature from the dumping feature, as is described in U.S. Pat. No. 5,806,932, owned by the assignee of the present invention. Although the invention separates the dumping device from the normal adjustment device of the seat back, the two devices are interconnected in a single system so that the seat back can be dumped while retaining its selected angle of inclination. The system disclosed in the '932 patent relies upon a master and slave seat lock and a memory latch to establish the angle of inclination of the seat back. To accommodate dumping, the memory latch is released while the master lock remains locked. A control subsystem coordinates simultaneous unlocking and relocking of the master and slave locks to set a selected seat position. When the dumping feature is activated, the control subsystem releases the memory latch and the slave lock, allowing the seat back to move freely, while the master lock remains locked, thereby retaining the selected position. When dumping is completed, the memory latch is restored to its locked position, re-establishing the seat back at its selected angle of incline.

While the adjustment mechanisms of the type shown in the '932 patent provide significant benefits over other adjustment mechanisms, there remains a need for improvements to seat adjustment and dumping mechanisms. For instance, most prior adjustment and dumping mechanisms rely upon relatively bulky stamped metal components that can be expensive to manufacture and difficult to assemble and that must be strong enough to hold the seat back in position. There remains a need for a seat adjustment mechanism that incorporates the function of retaining a selected seat position into the adjustment mechanism and that eliminates the need for stamped or machined metal components that can be bulky, heavy, expensive, and difficult to manufacture and assemble.

SUMMARY OF THE INVENTION

Briefly describing one aspect of the invention, the seat adjustment mechanism includes a positioning member for positioning the seat back relative to the support frame, a locking mechanism for locking the positioning member in a selected position, such as those disclosed in U.S. Pat. No. 4,794,470, and an arresting mechanism for re-engaging the locking mechanism after the seat back is dumped and as the seat back is transiting the selected position.

The difficulties with prior seat adjustment mechanisms are overcome in one aspect of the current invention by the arresting mechanism. The seat back is dumped from its selected position by shifting the locking mechanism to its disengaged state, freeing the positioning member and attached seat back to move. After the seat back is dumped and as the seat back is returned to its selected position, the arresting mechanism shifts the locking mechanism to its engaged state, engaging the positioning member and securing the seat back in the selected position. Because the locking mechanism is released to dump the seat, there is no need for bulky stamped or machined components in addition to the locking mechanisms that are capable of latching and securing the seat. Instead, the arresting mechanism can be generally constructed of small plastic, lightweight, inexpensive components that release and activate the locking mechanism and retain a selected seat position.

In one embodiment the arresting mechanism includes an arresting member that is coupled to the positioning member and that has an adjustable length set to correspond to a selected position of the positioning member relative to the locking mechanism. The arresting member is set into action by the positioning member arriving at the selected position. The action of the arresting member activates the arresting mechanism and shifts the locking mechanism from its disengaged state to its engaged state.

In another embodiment, the arresting member is a flexible cable that is attached at one end to the positioning member and at the other end to another part of the arresting mechanism. The action of the positioning member arriving at the selected position pulls the flexible cable, shifting the locking mechanism to its engaged state.

In a further aspect, the arresting mechanism provides a means for adjusting and retaining a feature of the arresting member. In one embodiment the feature is an adjustable length in which the arresting mechanism includes a take-up reel with a flexible cable extending to an adjustable length. The take-up reel can include a rotating spool for winding excess length of the flexible cable, a reel locking means for selectively locking and unlocking the spool, and a spool spring for tensioning and respooling excess flexible cable length when the spool is unlocked.

In another embodiment, the arresting member is a tensioning member and the feature is an adjustable tension limit. The tensioning member can include a means for adjusting the tension on the member that is required to active the arresting mechanism. The action of the positioning member arriving at the selected position tensions the tension member to the adjusted tension, shifting the locking mechanism to its engaged state.

In one feature of the invention, the adjustment mechanism includes a dump lever for holding the locking mechanism in its disengaged state. Activating a dump control toggles the dump lever, disengaging and holding the locking mechanism. The action of the positioning member arriving at the selected position activates the arresting mechanism, toggling the dump lever again, which re-engages the locking mechanism, securing the positioning member at the selected position.

In a further aspect, the adjustment mechanism includes an adjustment control for adjusting the arresting member feature. Activating the adjustment control disengages the locking mechanism so that the arresting member feature adjusts as the seat back and the connected positioning member are moved to a new selected position. Release of the adjustment control re-engages the locking mechanism and retains the arresting member feature.

In still another aspect, the adjustment mechanism includes an arresting mechanism selectively operable in several positions. The adjustment state is selected when the adjustment control is actuated to adjust the feature of the arresting member. The memory state is selected when the adjustment control is released and it sets and retains the arresting member feature. The arresting state is selected when the dump control is actuated and released and it disengages the locking mechanism, releasing the positioning member until the positioning member again transits the selected position, re-engaging the locking mechanism and securing the positioning member.

In a further aspect, the adjustment mechanism includes a master locking mechanism having an arresting mechanism and a slave locking mechanism. The slave locking mechanism is operatively connected with a slave cable to the master locking mechanism. The slave cable synchronizes the slave locking mechanism with the master locking mechanism engagement and disengagement. The action of the arresting mechanism operates on the master locking mechanism. A second arresting mechanism is not required for the slave locking mechanism because of the action of the slave cable.

One object of the invention is to provide a seat adjustment mechanism that can adjust the angle of incline of the seat and restore the seat back to a selected position after dumping. Another object is to eliminate the need for stamped or machined metal components to dump and restore the seat back position.

One benefit is that the seat back can be adjusted and the angle of incline stored with a single lever. Another benefit is that the adjustment mechanism requires only a single activation of a dump control actuator to release the seat back for dumping and to automatically relock the seat back when restored to the selected position.

These and other objects of the present invention will become more apparent from the following description of the preferred embodiment.

DESCRIPTION OF THE FIGURES

FIG. 2(a–c) is a functional diagram of a seat assembly with the seat back in various positions of adjustment.

FIG. 3(a–c) is a perspective view from the dump lever side of the master adjustment mechanism with the dump lever in various positions of adjustment.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

The present invention relates to adjustment mechanisms suited for vehicle seats, and particularly mechanisms that include a memory feature. The inventive adjustment system is of the type that provides a means of selecting a preferred seat position, releasing the adjustment mechanism for free movement of the seat, and automatically arresting the adjustment mechanism, securing the seat at the selected position.

Figure 1:
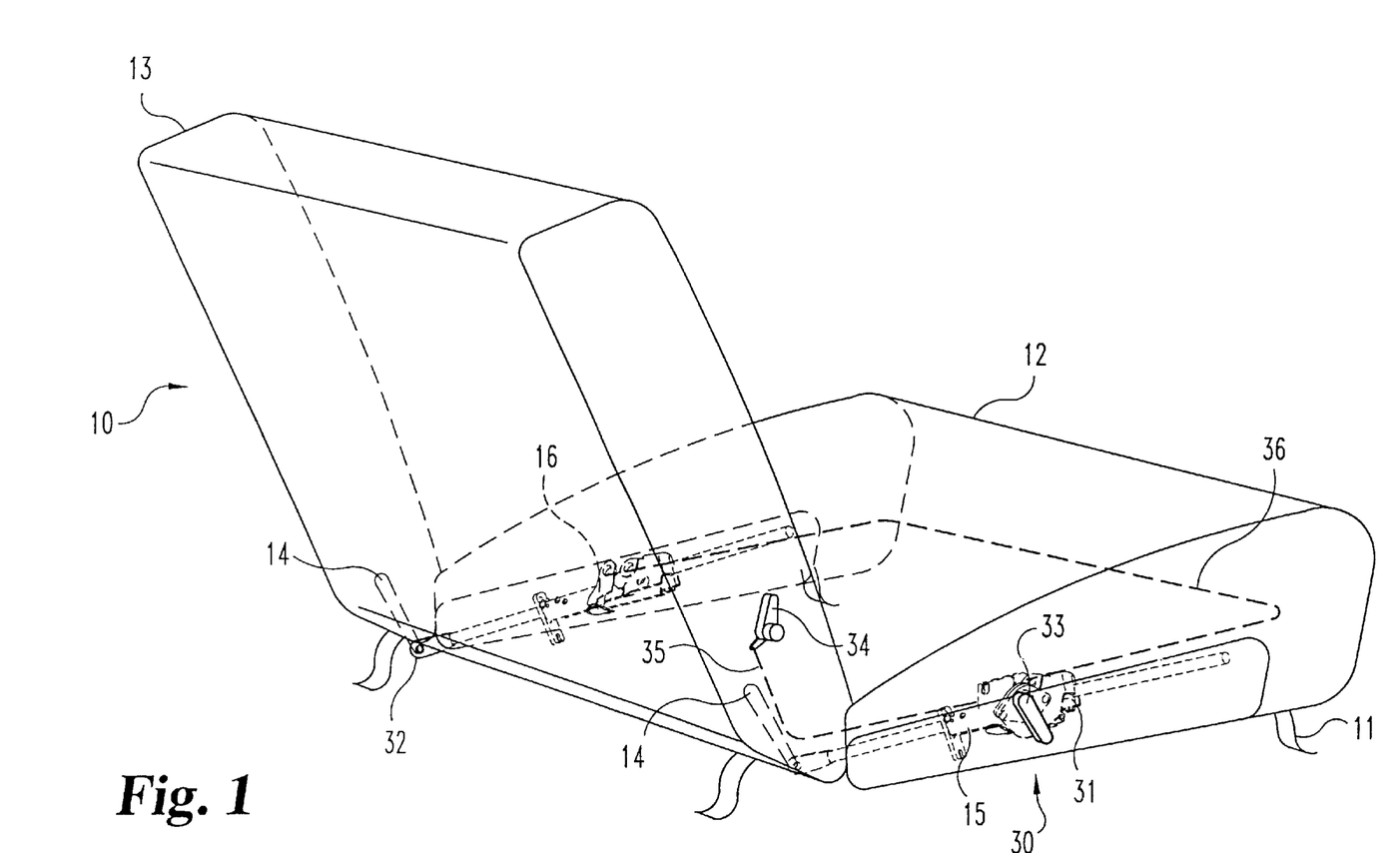
FIG. 1 is a perspective view of a seat assembly.

In accordance with one embodiment of the invention, the inventive seat adjustment mechanism is mounted on a seat, such as a front seat of a two-door passenger vehicle as depicted by FIG. 1. Specifically, a seat assembly 10 is connected to the vehicle body by way of a support frame 11. The seat assembly 10 includes a seat bottom 12, a seat back 13, and frame pivots 14. The seat adjustment assembly 30, depicted in FIG. 1, is mounted on the seat assembly 10 and/or the support frame 11. By the simple expedient of an adjustment control 33, a passenger can adjust the angle of incline of the seat back 13 to a selected position of comfort as depicted in FIG. 2(a). The seat back 13 can be adjusted in either direction through a range of adjustment 20a to 20b relative to the seat bottom 12 and the support frame 11.

When passengers enter the rear seat of a two-door vehicle, it is often necessary to pivot or "dump" the seat back of the front seat forward to allow easy access to the rear of the vehicle. This process is shown schematically in FIGS. 2(a)–(c). As shown in FIG. 2(a), the passenger can adjust the seat back to a selected seat position 21, corresponding to an angle of inclination 22. However, when a passenger desires access to the rear of the vehicle, pivoting the seat forward as depicted in FIG. 2(b) dumps the seat back 13 from its selected seat position 21, to its dumped position 23. Dumping is selected by a dump control 34 that disengages the locking mechanisms 51 (FIG. 3(a)) of the master adjustment mechanism 15 and the slave adjustment mechanism 16 (FIG. 1), freeing the seat back to swing. The slave adjustment mechanism 16 is synchronized with the master adjustment mechanism 15 via slave cable 36 (FIG. 1).

Figure 3A:
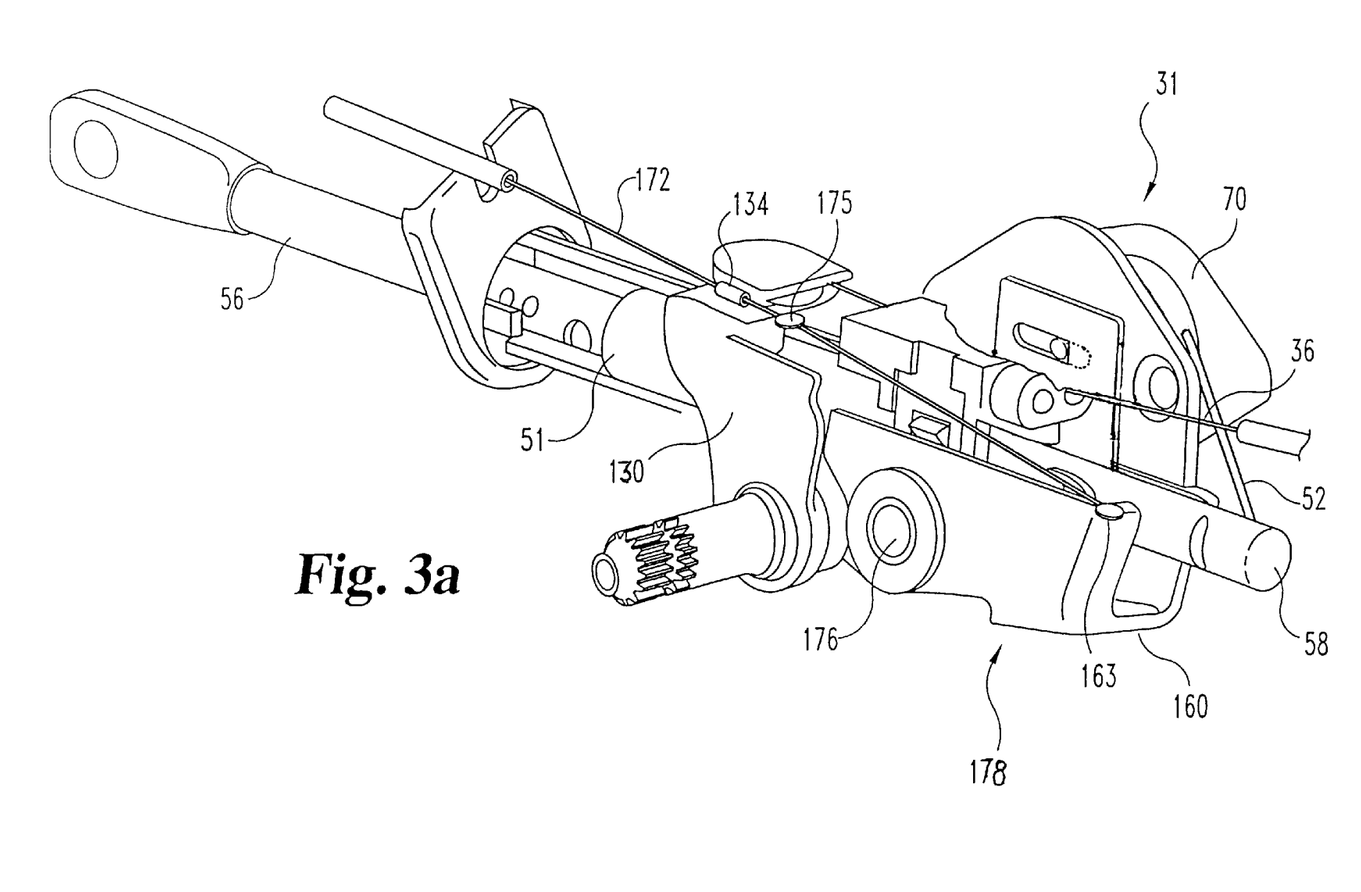
Figure 4:
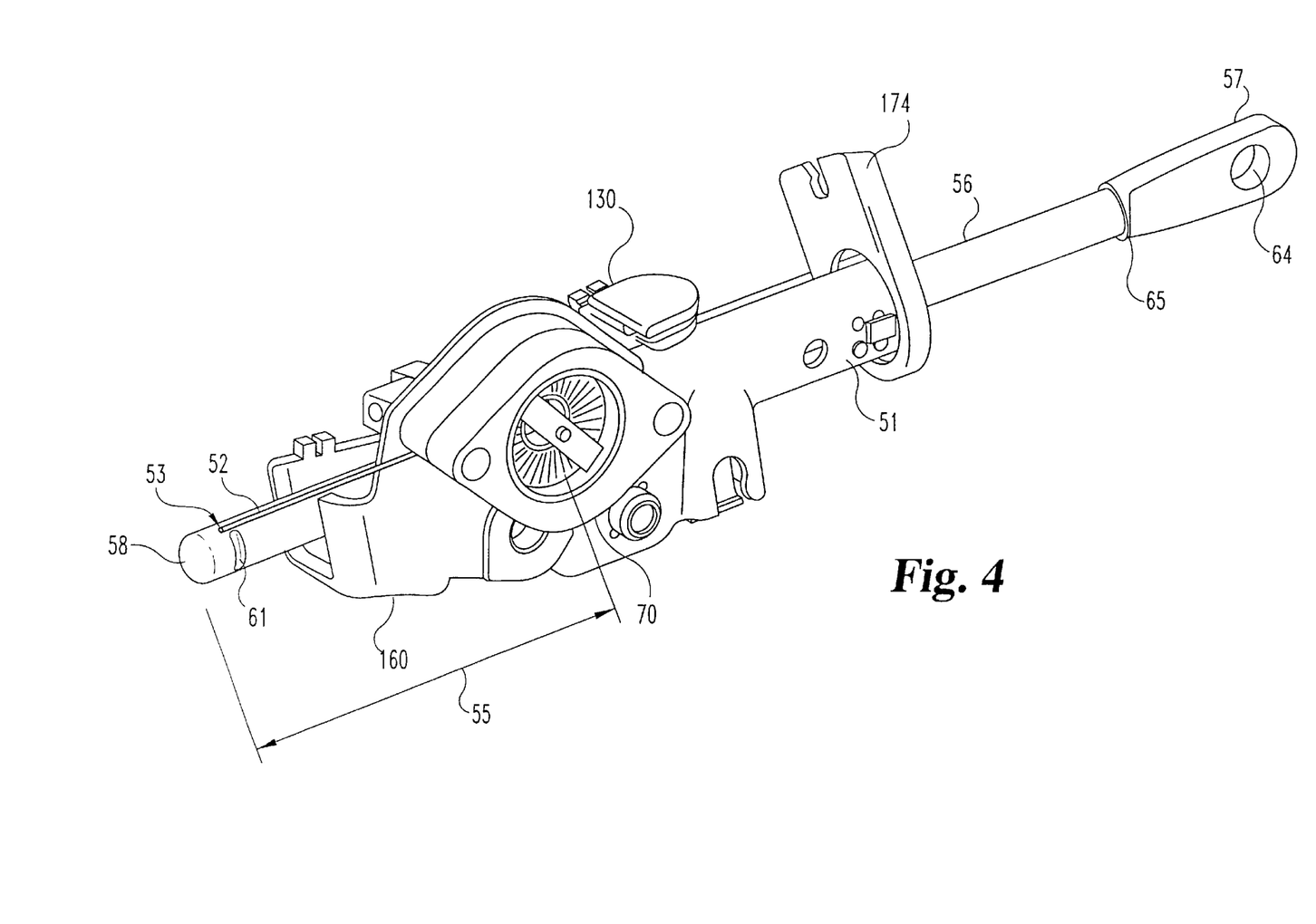
FIG. 4 is a perspective view from the take-up reel side of the master adjustment mechanism.

One embodiment of the seat adjustment mechanism 50 is depicted in FIGS. 3(a) and 4 and includes a positioning member 56 and a locking mechanism 51. The locking mechanism 51 can be of the type disclosed in U.S. Pat. No.

4,794,470, owned by the assignee of the present invention and known as the Mechlok™. The positioning member 51 can be an elongated metal rod having a flange end 57 and an arresting end 58. Either the locking mechanism 51 or the positioning member 56 is connected to the support frame 11 and the other is connected to the seat back 13. Preferably the positioning member flange end 57 is flattened and has a through bore 64 for connecting to the seat back 13 while the locking mechanism 51 is attached to the support frame 11 by suitable brackets or supports. The relative position of the positioning member 56 to the locking mechanism 51 changes as the position of the seat back is adjusted relative to the support frame 11 and the seat back 13 (FIG. 1).

The locking mechanism 51 is also operably associated with the positioning member 56. Preferably the positioning member 56 passes through the locking mechanism 51. The locking mechanism has a disengaged state and an engaged state. When disengaged, the positioning member 56 is free to translate axially relative to the locking mechanism 51. When engaged the positioning member is secured by the locking mechanism so that it cannot move. Thus, when the locking mechanism 51 is engaged, the positioning member 56 and the connected seat back 13 are secured and do not move relative to the support frame 11 and the seat back 13. When the locking mechanism is disengaged, the positioning member is free to translate and the connected seat back can pivot about the frame pivots 14. The positioning member 56 can also have a stop 61 (FIG. 4) near the arresting end 58 and a flange shoulder 65 at the beginning of the flange 57. Both serve to retain the positioning member 56 within the locking mechanism 51 by blocking further translation of the member through the locking mechanism when the stop 61 or shoulder 65 contact an end of the locking mechanism.

Figure 7:
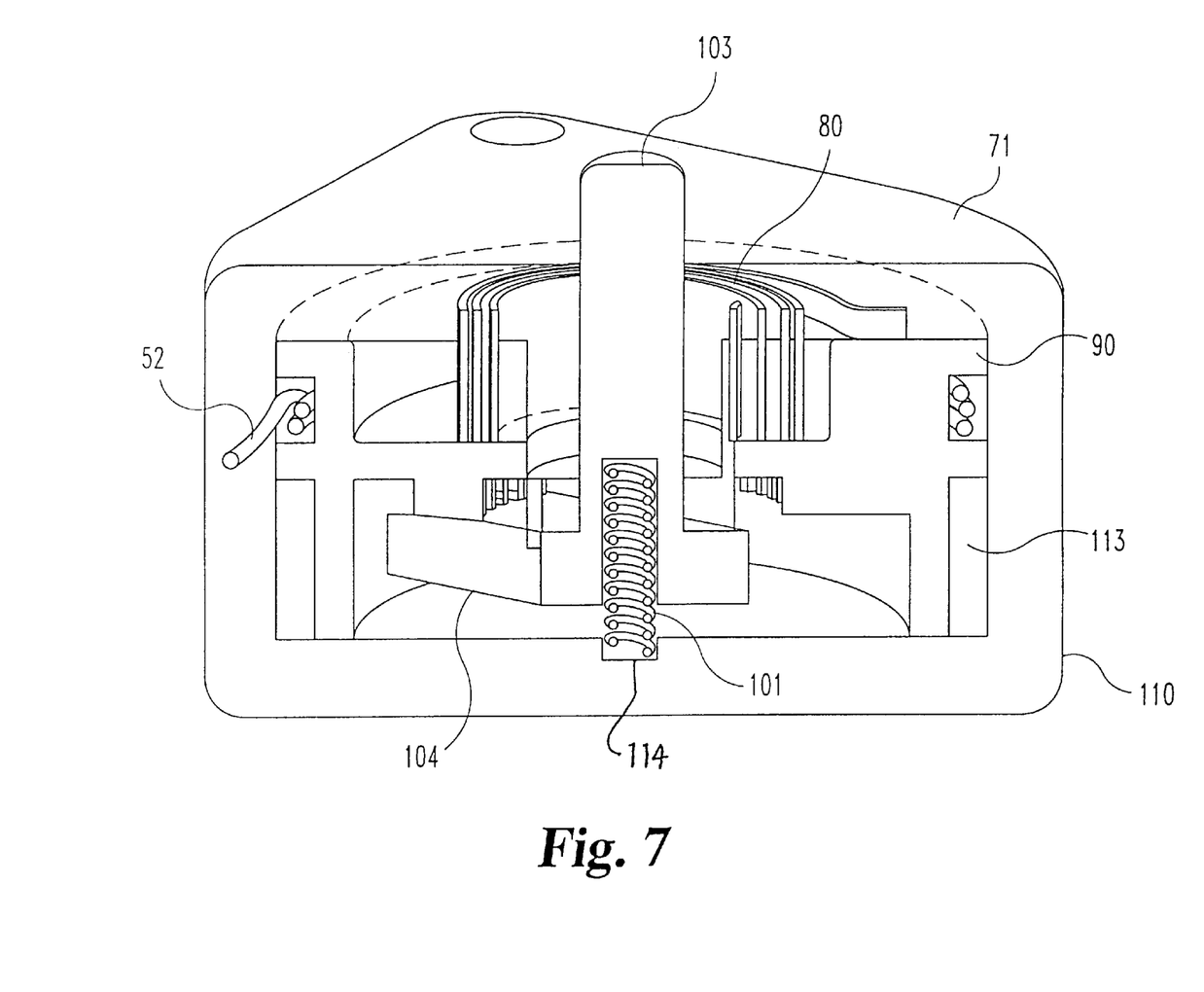
FIG. 7 is a cross-sectional view of the take-up reel assembly shown in FIG. 6.

As depicted in FIG. 4, the preferred embodiment of the invention includes an arresting mechanism 70, that retains the selected seat position 21 and automatically reengages the locking mechanism 51 when the seat back 13 is returned to its selected position, arresting and securing the seat at that position. Most prior adjustment and dumping mechanisms rely upon relatively bulky stamped metal components to accomplish the retaining, dumping, and arresting functions. These components can be expensive to manufacture and difficult to assemble and must be strong enough to hold the seat back in position. The present invention incorporates the function of retaining, dumping, and arresting a seat position into an arresting mechanism 70 and the master adjustment mechanism 15 by adding a few light weight and typically plastic components that eliminate the need for stamped or machined metal components that can be bulky, heavy, expensive, and difficult to manufacture and assemble. In the preferred embodiment the arresting mechanism includes a spool 90 and a flexible cable 52 (FIG. 7).

The arresting mechanism 70 is preferably attached to the adjustment mechanism 50, and includes at least an arresting member 52 shown in FIG. 4 that is coupled at a first end 53 with the positioning member 56, preferably at the arresting end 58, and a second end coupled with the arresting mechanism. As the positioning member 56 is repositioned relative to the adjustment mechanism 50, the arresting end 58 of the positioning member and the attached arresting member first end 53 necessarily move relative to the arresting mechanism 70.

The arresting member 52 has an adjustable length 55 defined as the length of the arresting member extending from the arresting mechanism 70 to the arresting end 58 of the positioning member. The adjustable length 55 corresponds to a selected position of the positioning member 56 relative to the adjustment mechanism 50. The selected position corresponds with the selected seat position 21 of the seat back 13 relative to the support frame 11, i.e. since the positioning member is connected to the seat back when the seat back is in its selected position, the positioning member is also in its selected position and the distance between the arresting end 58 of the positioning member and the arresting mechanism 70 is equal to the adjustable length 55 of the arresting member.

The selected seat position 21 of the seat back 13 is set according to the preference of the seat occupant. Setting the selected seat position 21 of the seat back 13 places the connected positioning member 56 in a selected position. The arresting mechanism 70 simultaneously sets and retains the adjustment length 55 of the arresting member 52 extending from the arresting mechanism 70 to the arresting end 58 of the positioning member. The relationship between the selected seat position 21 of the seat back 13 and the arresting member adjustment length is the means by which the invention retains the selected seat position 21.

When the locking mechanism 51 is disengaged and the seat back 13 is dumped as depicted in FIG. 2(b) the arresting end 58 of the positioning member moves toward the arresting mechanism 70 (FIG. 4) so that the distance between the arresting end 58 and the arresting mechanism 70 is less than the retained adjustment length 55 of the arresting member. As the seat back 13 is returned toward selected seat position 21, the distance between the arresting end 58 and the arresting mechanism 70 approaches the adjustment length. When the distance is equal to the adjustment length, further movement of the positioning member 56 will set into action the arresting member 52 activating the arresting mechanism 70. The arresting mechanism 70 then shifts the locking mechanism 51 to its engaged state, securing the positioning member 56 and the seat back 13 in their corresponding selected position 21.

The arresting member 52 can be a flexible cable, preferably a nylon coated steel cable, that is attached at a first end 53 to the arresting end 58 of the positioning member and at a second end to another part of the arresting mechanism 70. As the seat back 13 is returned from the dumped position 23 and the distance between the arresting end 58 of the positioning member and the arresting mechanism 70 is increasing, the distance will equal the adjustment length 55 when the positioning member 56 arrives at the selected position, and the arresting end 58 of the positioning member will then tension the flexible cable 52 between its two coupled ends. The second end is coupled to the arresting mechanism 70 and the action of the flexible cable 52 being extended to its adjustment length activates the arresting mechanism, shifting the locking mechanism 51 to its engaged state.

In a further aspect of the invention, the arresting mechanism 70 provides means for adjusting and retaining the adjustment length of the arresting member 52. The preferred embodiment of the arresting mechanism shown in FIG. 6 and 7 includes a take-up spool 90 and a flexible cable 52 extending from the spool. The arresting mechanism 70 can include a reel housing 71, a reel cover 110, a rotating spool 90 for winding excess length of the flexible cable 52, a spool locking key 100 for selectively locking and unlocking the spool, a locking key bias spring 101, and a spool spring 80 for tensioning and respooling excess flexible cable length when the spool is unlocked. Other than the springs, the arresting mechanism 70 components are preferably molded plastic parts.

Figure 6:
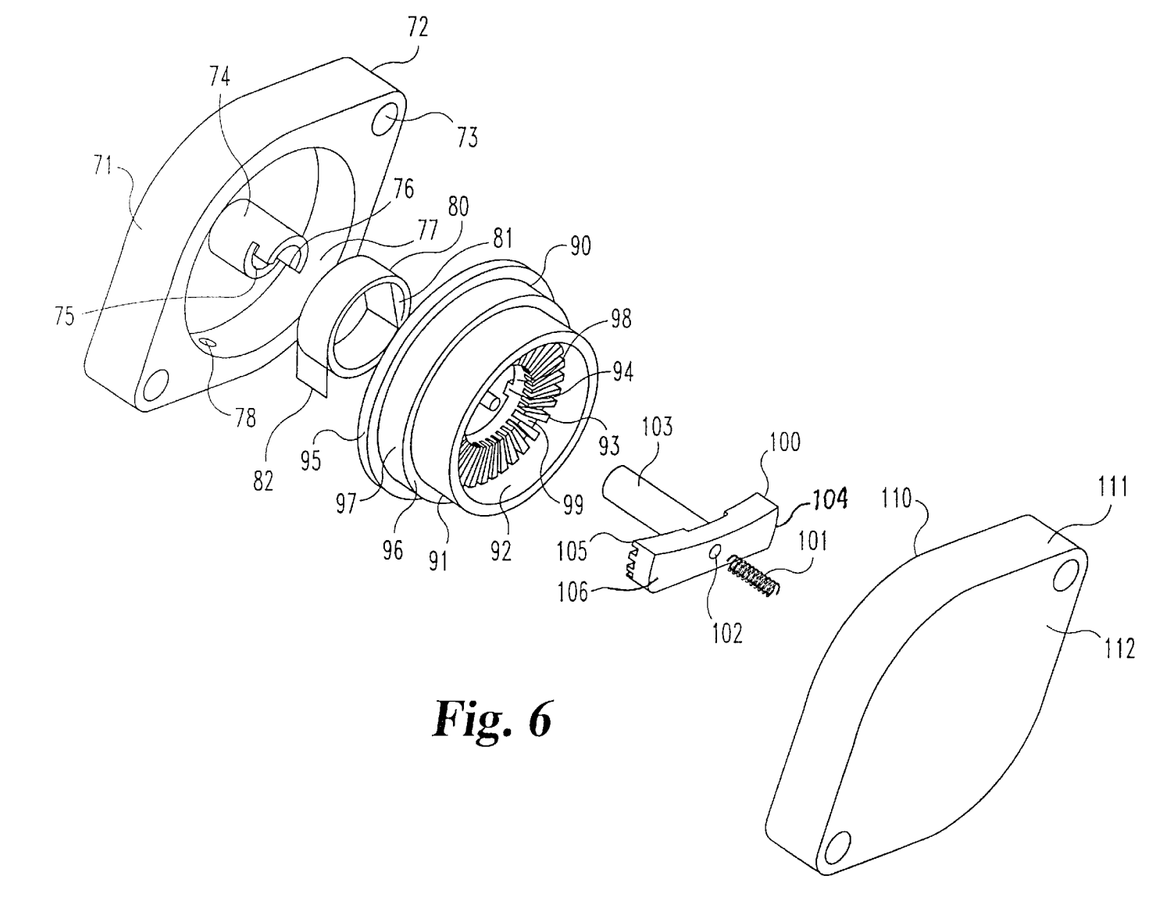
FIG. 6 is an exploded perspective view of the take-up reel assembly.

The reel housing 71 has mounting ears 72 located at two opposite portions of the circumference of the housing. A mounting hole 73 for mounting the take-up reel 70 is located through each mounting ear 72. One flat side of the housing has a deep circular recess forming a spool seat 77 for receiving the cable spool 90 and has a diameter that is slightly larger than the largest cable spool diameter. Bored through the outside circumference of the spool seat 77 is a cable pass-through 78 sized to allow the first end 53 of the flexible cable 52 to extend from the winding spool 80 to the arresting end 58 of the positioning member located outside the arresting mechanism 70. Protruding from the center of the spool seat 77 is a cylinder shaped spring post 74 having a catch 76 at two opposite portions of the outside diameter of the post and a key pin guide bore 75 in the center of the post and passing all the way through the post and the housing 71.

The spool spring 80 is sandwiched between the reel housing spring post 74 and the cable spool 90 that rests in the spool seat 77. The spool spring 80 is a ribbon shaped coil spring and is retained on the spring post 74 by an inside spring tab 81. An outside spring tab 82 joins with a spring catch 94 on the spool 90 and transmits spring tension from the spring 80 to the spool.

The cable spool 90 is preferably hub shaped with an outer rim 95 at the bottom and a inner rim 96 near the center of the outside wall 91, together forming a winding track 97 for guiding and retaining the flexible cable 52 wound upon it. The interior of the spool wall has a cylindrical hub wall 92, a washer shaped hub face 99 at a particular depth from the bottom of the spool, and a spool clearance hole 98 through the center of the hub face. The full circumference hub face 99 has numerous locking teeth 93 extending from the inside edge of the face formed between the clearance hole 98 and the radially outward interior hub wall 92.

The spool locking key 100 stops spool rotation when the key locking teeth 105, located on a face 106 of a key tee 104, are engaged with the spool locking teeth 93. The locking key 100 resists rotation by engagement with two catches 76 located on the end of the spring post 74. The locking key 100 is preferably in a "T" shape, with the key tee 104 forming the top of the "T" and the cylindrical pin 103 that extends from the locking teeth 93 side of the key tee forming the bottom of the "T". The locking key pin 103 extends through the spool clearance hole 98 and the key pin guide bore 75, and protrudes through and extends from the spool housing 71. The key pin 103 is biased to engage the key teeth 105 with the spool teeth 93 by the key bias spring 101. The spring 101 is preferably seated in a key spring recess 102 aligned with the key pin and located on the top face 104 of the key 100. The key pin 103 protrudes through the spool housing 71 so that depressing the protruding pin disengages the key teeth 105 from the spool teeth 93 freeing the spool to rotate under the tension of the spool spring 80 and the flexible cable 52.

The reel cover 110 has an exterior shape matching that of the reel housing 71. Together the cover 110 and housing 71 completely enclose, in a clam shell fashion, the spool 90, spool spring 80, locking key 100, and key bias spring 110. Similar to the reel housing 71, the cover 110 can include two mounting ears 111, and mounting holes 112. The side of the cover 110 facing the housing 71, defines the recess 113 (FIG. 7) which is sized and shaped to seat one end of the spool 90. The cover 110 can also define a spring seat 114 in the center of the recess for receiving the key bias spring 101.

The take-up reel assembly 70 sets and retains the length of the flexible cable 52 extending from the spool 90. Tension to wind excess length cable onto the spool 90 is provided by the spool spring 80. By locking the spool 90 rotation and thereby setting the cable length extending from the arresting mechanism 70, a selected position of the positioning member 56 and the selected seat position 21 are retained. Depressing the locking key pin 103 unlocks the spool 90 by disengaging the opposing locking teeth 93 and 105 so that movement of the positioning member 56 away from the take-up reel 70 tensions the flexible cable 52, pulling additional length off the spool 90. Movement of the positioning member 56 toward the take-up reel 70 allows the spool spring 80 to rotate the take-up spool 90 and coil additional length of the flexible cable 52 onto the spool.

The master adjustment mechanism 50 includes an adjustment control 130 (FIG. 5) for adjusting the seat back 13 selected seat position 21. In accordance with the invention, the control 130 also controls the arresting member feature and the arresting member adjustment length in the preferred embodiment. Activating the adjustment control 130 preferably simultaneously disengages the locking mechanism 51 and the take-up reel locking key 100 as shown in FIG. 3(C). Disengaging the key 100 allows the spool 90 to rotate and the adjustment length to change as the positioning member 56 is moved to a new selected position. Release of the adjustment control re-engages the locking mechanism and the locking key 100 so that the arresting mechanism 70 retains the adjustment length corresponding to the selected position of the seat back 21 and the positioning member. In the not preferred embodiment, the slave adjustment mechanism 16 does not require an adjustment control 130 as the slave adjustment locking mechanism 16 is synchronized with the master adjustment locking mechanism 51 via a slave cable 36 (FIG. 1).

More specifically, the adjustment control 130 (FIG. 5) can be constructed of plastic and can include at least a spindle arm 131, a spindle 133, an adjustment shaft 137, and an adjustment pin 139. The adjustment control 130 mounts on the master adjustment mechanism 50 with an adjustment pin 139. The adjustment pin 139 allows the adjustment control 130 to pivot relative to the adjustment mechanism 50. Extending from the adjustment pin 139 is an adjustment shaft 137 preferably having a serrated shaft end 138 for mounting a handle or lever for actuating the adjustment control 130. At the junction of the adjustment pin 50 and adjustment shaft 137 is a spindle arm 131. The spindle arm 131 and spindle support 136 form a right angle lever arm that provides an arm and support end 132 for the spindle 133 and that translates rotational motion of the adjustment shaft 137 to linear motion of the spindle. The spindle 133 and spindle horn 135 form a saddle horn type shape around which the locking mechanism cable 36 is secured. Rotation of the adjustment shaft 137 away from the cable block 59 as shown in FIG. 3(a) tensions the locking mechanism cable 36 disengaging the locking mechanism 51. Because the locking mechanism 51 is spring loaded to the engaged state, release of the adjustment shaft 137 will reengage the locking mechanism.

Figure 5:
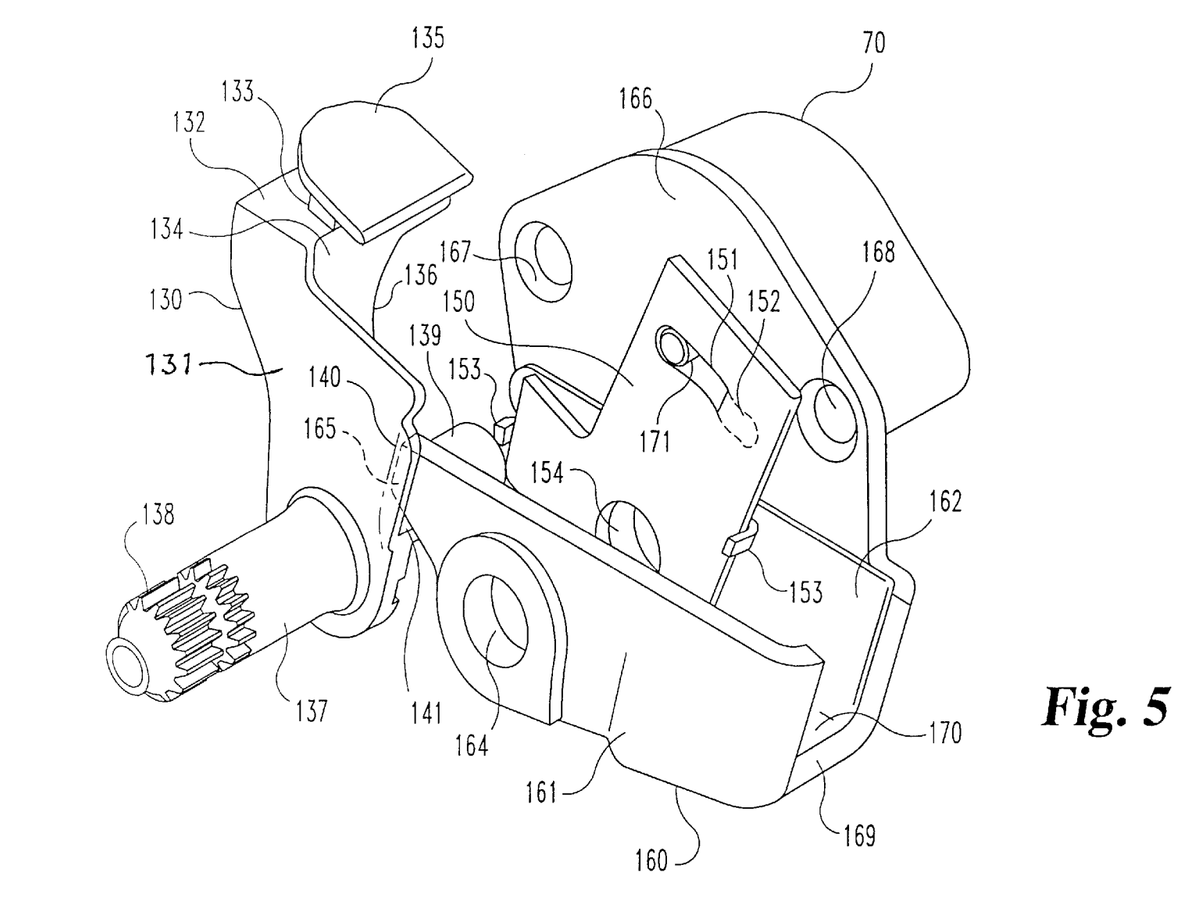
FIG. 5 is a perspective view of the dump lever assembly.

In a further aspect of the invention, the master adjustment mechanism 50 includes a dump lever 160 shown in FIG. 5 for holding the locking mechanism 51 in its disengaged state, for supporting the take-up reel assembly 70, and for cooperating with the adjustment control 130 to reset the arresting member adjustment length.

More specifically, the dump lever 160 can be molded plastic and preferably includes at least a lift side 161 and an arresting mechanism support side 162 connected together to form an extruded "U" shape by a dump lever bottom 170. Near one end of the extruded "U" shape, the two sides 161 and 162 each have an aligned pivot hole 164 that serve as a pivot point for the dump lever 160 and are used to pivotably mount the dump lever to the master adjustment mechanism 50 with a dump pivot pin 176 (FIG. 3(a)). At the other end of the extruded shape, the dump lever 160 can have radiused corners to strengthen the lever 160 to resist deformation. However, the sides 161 and 162 are not covered with a cap at the end of the extruded "U" shape because the end must form a rod clearance opening 169 through which the arresting end 58 of the positioning member 56 extends.

The support side 162 has projecting from it a reel mounting flange 166, shaped similar to the reel housing 71 and onto which the take-up reel assembly 70 is mounted through the two countersunk flange holes 167 with fasteners 168 on the side of the flange that is outside the "U" formed by the two dump lever sides 161 and 162. The spool locking key pin 103 protrudes from the take up reel assembly 70 through a pin clearance hole 171 located at the centroid of the reel mounting flange 166.

A rectangular adjustment plate 150 can be sandwiched against the support side 162 on the interior side of the "U" formed by the two dump lever sides 161 and 162. The adjustment plate 150 has a mounting hole 154 at one end through which the dump pivot pin 176 passes. On adjacent sides of the adjustment plate are located plate locking tabs 153 to rotationally secure the plate 150 to the locking mechanism 51 cable block tangs 60 (FIG. 3(a)). The adjustment plate extends from the support side 162 to the reel mounting flange 163 and has an arcuate key pin slot 151 cut through it. The pin slot 151 has a ramp 152 at one end so that as the dump lever 160 and arresting mechanism 70 are pivoted relative to the plate 150, the reel locking key pin 103 is drawn to the end of the pin slot, the end of the key pin contacts the ramp 152. As the dump lever 160 rotates further, the ramp 152 depresses the pin as shown in FIG. 3(c), thereby unlocking the take-up reel spool 90.

More specifically, the operation of unlocking the take-up reel spool 90 to set the adjustment length of the flexible cable 52 can be achieved by first rotating the adjustment control 130 counter clockwise using the attached adjustment actuator 33. The adjustment control spindle arm 131 has a dump lift 141 (FIG. 5) located such that as the adjustment control 130 is rotated, the lift 141 will contact a lift and detent point 165 located on the dump lever lift side 161 near the pivot hole 164. Actuation of the adjustment control therefore rotates the dump lever from the second position 178 (FIG. 3(a)) to the third position 179 (FIG. 3(c)) at which the rotation causes the key pin 103 to be depressed by the adjustment plate 150, unlocking the take-up reel spool 90. At the same time, as discussed above, actuation of the adjustment control 130 disengages the locking mechanism 51 so that the positioning member 56 and the attached seat back 13 are free to translate and pivot, respectively. The unlocked take-up reel spool 90 is disengaged by the opposing locking teeth 93 and 105 (FIG. 6) so that movement of the positioning member 56 away from the take-up reel 70 tensions the flexible cable 52, pulling additional length off the spool 90. Movement of the positioning member 56 toward the take-up reel 70 allows the spool spring 80 to rotate the spool 90 and take-up additional length of the flexible cable 52 onto the spool.

When the seat back 13 is located at the new selected seat position 21, releasing the adjustment control 130 will re-engage the locking mechanism 51, return the dump lever 160 to the second position 178 (FIG. 3(a)) which releases the locking key pin 103 and locks the take-up reel spool 90. The locked spool 90, then retains the adjustment length of the flexible cable 120 that corresponds with the selected positions of the positioning member 120 and the seat back 21 that were set upon release of the adjustment control 130.

Figure 3B:
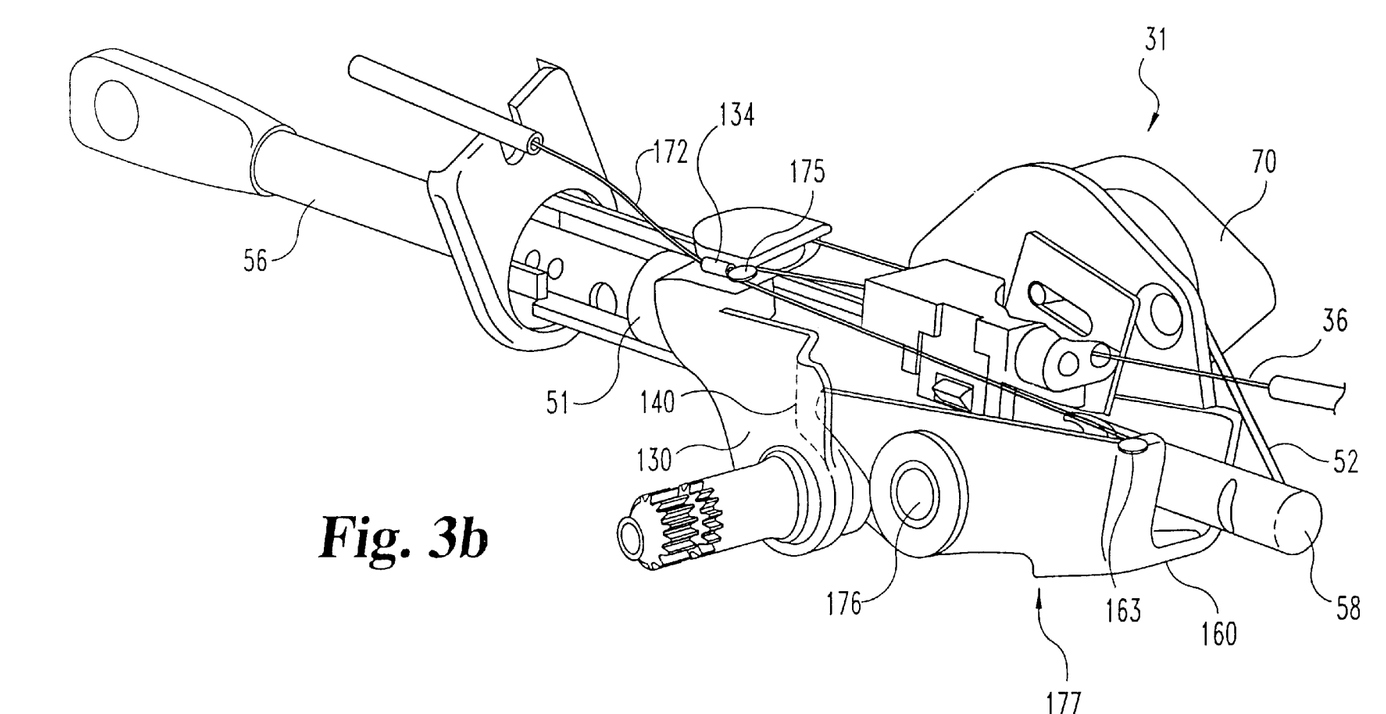
Figure 3C:
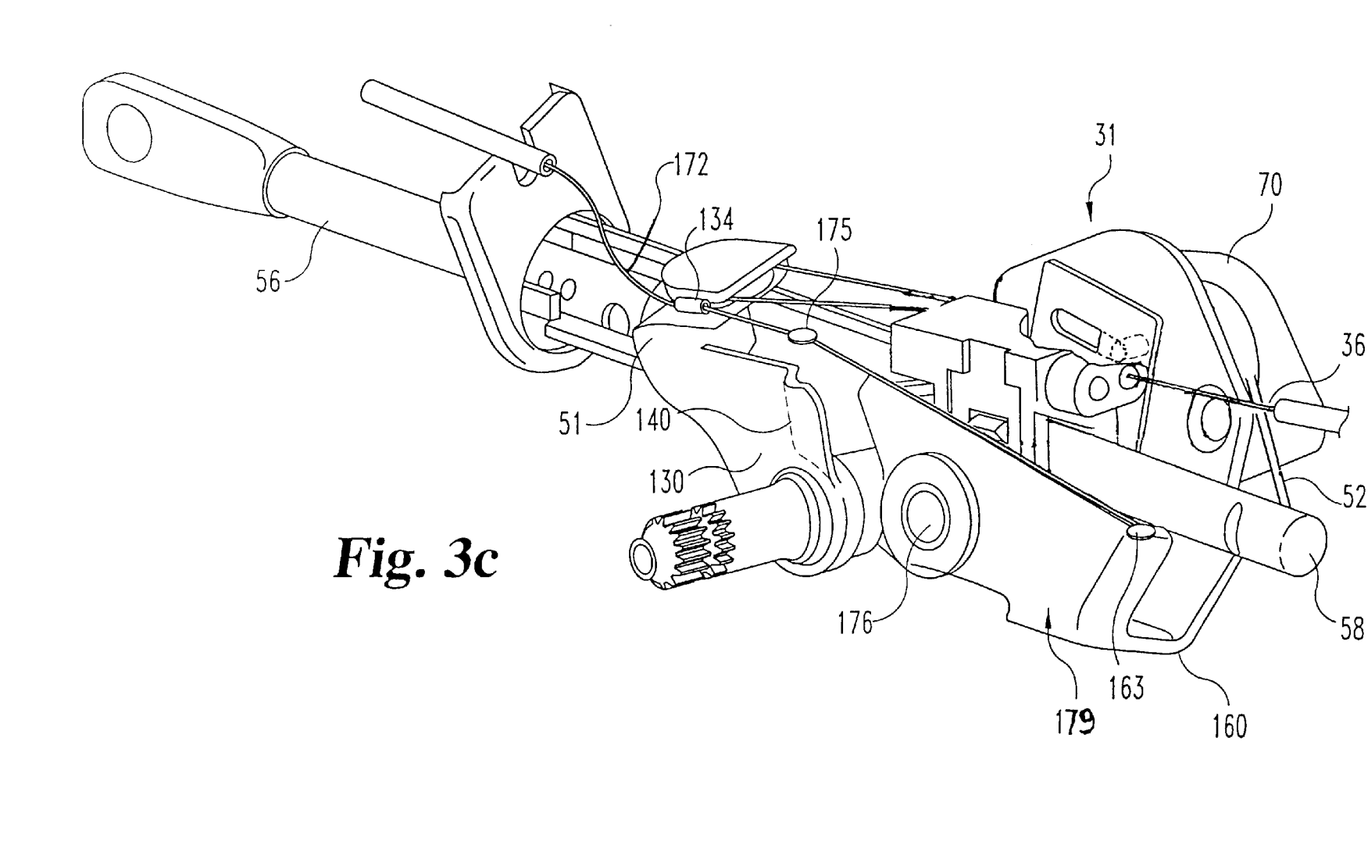

In another aspect of the invention, seat back dumping can be selected by actuating the dump control 34, which pulls dump cable 172, and toggles the dump lever 160 to a first position 177 (FIG. 3(b)), and rotates the adjustment control 130 counter clockwise, disengaging and holding the locking mechanism 51 of the master adjustment mechanism 15 so that the positioning member 56 can translate in the locking mechanism as the seat back 13 is pivoted forward. Pivoting the seat forward as depicted in FIG. 2(b) dumps the seat back 13 from its selected seat position 21, to its dumped position 23. The action of the positioning member 56 arriving at the selected position activates the arresting mechanism 70, toggling the dump lever 160 to a second position 178 (FIG. 3(a)), which re-engages the locking mechanisms 51, securing the positioning member and the seat back 13 at the selected position 21. The arresting mechanism 70 retains the selected seat position 21 where the seat back 13 started dumping from and automatically reengages the locking mechanisms 51 when the seat back is returned to its selected position, arresting and securing the seat at that position. The slave adjustment mechanism 16 does not require a dump lever 16 as the slave adjustment locking mechanism 16 is synchronized with the master adjustment locking mechanism 51 via slave cable 36 (FIG. 1).

More specifically, actuating the dump control 34, operates a dump cable 172 (FIG. 3(b)) which preferably extends from the dump control through a sheath 173 and to the cable guide 174 that is mounted on the master adjustment mechanism 50. The cable 172 then passes through a spindle guide 134 on the adjustment control 130 and terminates at dump cable anchor 163 located on the dump lever lift side 161 near the rod clearance opening 169. At a point on the cable immediately after it passes through the spindle guide 134, the cable has a crimped collar 175.

When the dump control 34 is actuated, the dump cable collar 175 pulls against the spindle guide 134 and actuates the adjustment control 130, disengaging the locking mechanism 51 as described above. Simultaneously, the dump lever 160 is toggled from the second position 178 (FIG. 3(a)) to a first position 177 (FIG. 3(b)) by the dump cable 172 pulling on the cable anchor 163. The first position 177 of the dump lever 170 and rotation of the adjustment control spindle arm 131 engages the dump lever lift and detent point 165 with the dump lock detent 140 on the spindle arm as shown in FIG. 5. The engagement of the spindle arm lock detent 140 and the dump lever detent point 165 locks the spindle arm in a position that holds the locking mechanism 51 disengaged even after the dump control is released. The positioning member 56 is therefore free to translate in the locking mechanism as the seat back 13 is pivoted forward to the dump position 23 (FIG. 2(b)). As the seat back 13 is pivoted forward toward the dump position 23, the positioning member 56 is translated toward the arresting mechanism 70 so that the distance between the arresting end 58 of the positioning member and the arresting mechanism 70 is less than the retained arresting member adjustment length the amount of flexible cable 52 extending from the arresting mechanism 70.

As the seat back 13 is returned toward selected seat position 21 (FIG. 2(c)) the action of the positioning member 56 arriving at the selected position activates the arresting mechanism 70. Activation occurs when the distance approaches the adjustment length. When the distance is equal to the adjustment length 55 (FIG. 4), any further movement of the positioning member 56 will tension the connected flexible cable 52 and pull the locked spool 90 and take-up reel assembly 70. Because the actuating mechanism 70 is mounted on the dump lever 160, the dump lever pivots, toggling it from the first position 177 (FIG. 3(b)) back to the second position 178 (FIG. 3(a)), which disengages the lift and detent point 165 (FIG. 5) from the dump lock detent 140, releasing the adjustment control 130 and re-engaging the locking mechanism 51, which secures the positioning member 56 and the seat back 13 at their selected positions. Note that actuation of the dump control 34 does not unlock the take-up reel spool 90 because the dump lever 160 rotates the locking key pin 103 away from the slot ramp 152 as shown in FIG. 3(c), rather than toward it, as happens when the adjustment control 33 is actuated.

In a further aspect, the master adjustment mechanism 50 includes an arresting mechanism 70 selectively operable in three different states. The adjustment state is selected when the adjustment control 130 (FIG. 5) is actuated. In the adjustment state, the seat occupant selects the seat back 13 selected seat position 21 and arresting member feature, the arresting member adjustment length in the preferred embodiment, by manually moving the seat back 13 to a favored position. Activating the adjustment control 130 disengages the locking mechanism 51 and the take-up reel locking key 100 so that the spool 90 rotates and the adjustment length adjusts as the positioning member 56 is moved to a new selected position by the connected seat back 13.

More specifically, when the adjustment state is selected, rotation of the adjustment shaft 137 away from the locking mechanism cable block 59 tensions the locking mechanism cable 36, disengaging the locking mechanism 51. The adjustment control spindle arm 131 dump lift 141 (FIG. 5) will contact the lift and detent point 165 located on the dump lever lift side 161. The adjustment state therefore rotates the dump lever from the second position 178 (FIG. 3(a)) to the third position 179 (FIG. 3(c)) causing the key pin 103 to be depressed by the adjustment plate 150 and unlocking the take-up reel spool 90. The unlocked take-up reel spool 90 is disengaged by the opposing locking teeth 93 and 105 so that movement of the seat back 13 translates the connected positioning member 56. Translation of the positioning member 56 away from the take-up reel 70 tensions the flexible cable 52, pulling additional length off the spool 90. Translation of the positioning member 56 toward the take-up reel 70 allows the spool spring 80 to rotate the spool 90 and take-up additional length of the flexible cable 52 onto the spool. Movement of the seat back 13 thereby adjusts the arresting member adjustment length—in the preferred embodiment, the flexible cable 52 adjustment length extending from the take-up reel.

The memory state is selected when the adjustment control 130 is released, setting and retaining the arresting member adjustment length. After the seat back 13 is located at the new selected seat position 21 using the adjustment state specified above, releasing the adjustment control 130 will cause the spring loaded locking mechanism 51 to re-engage. Disengagement of the adjustment control spindle arm 131 dump lift 141 from the lift and detent point 165 will return the dump lever 160 to the second position 178 (FIG. 3(a)), releasing the locking key pin 103 from the adjustment plate 150 slot ramp 152 and locking the take-up reel spool 90. The locked spool 90 then retains the adjustment length of the flexible cable 52 that corresponds with the selected positions of the positioning member 56 and the seat back 21.

The arresting state is selected when the dump control 34 is actuated and released, disengaging the locking mechanism 51 and releasing the positioning member 56 until the positioning member again transits the selected position. When the positioning member 56 again transits the selected position, the arresting mechanism 70 re-engages the locking mechanism 51 and secures the positioning member and seat back at their respective selected position 21. The arresting state accommodates "dumping" the seat back 13 as depicted in FIGS. 2(b)–(c).

More specifically, the arresting state is selected by actuating the dump control 34. When the dump control 34 is actuated, the dump cable collar 175 is pulled against the spindle guide 134 and actuates the adjustment control 130, disengaged the locking mechanism 51. Simultaneously, the dump lever 160 is toggled from the second position 178 (FIG. 3(a)) to a first position 177 ((FIG. 3(b)) by the dump cable 172 pulling on the cable anchor 163. The first position 177 of the dump lever 170 and rotation of the adjustment control spindle arm 131 engages the dump lever lift and detent point 165 with the dump lock detent 140 on the spindle arm as shown in FIG. 5. The engagement of the spindle arm lock detent 140 and the dump lever detent point 165 holds the spindle arm in the position necessary to keep the locking mechanism 51 disengaged even after the dump control is released. The positioning member 56 is therefore free to translate in the locking mechanism as the seat back 13 is pivoted forward to the dump position 23 (FIG. 2(b)). As the seat back 13 is pivoted forward toward the dump position 23, the positioning member 56 is translated toward the arresting mechanism 70 so that the distance between the arresting end 58 of the positioning member and the arresting mechanism 70 is less than the length of the flexible cable 52 extending from the arresting mechanism.

As the seat back 13 is returned toward selected seat position 21 (FIG. 2(c)) the action of positioning member 56 arriving at the selected position activates the arresting mechanism 70. Activation occurs when the distance between the positioning member arresting end 58 and the arresting mechanism 70 when the distance is equal to the adjustment length 55 (FIG. 4) of flexible cable 52 extending from the take-up spool 90. Any further movement of the positioning member 56 will tension the connected flexible cable 52 and pull the locked spool 90 and take-up reel assembly 70. Because the take-up reel 70 is mounted on the dump lever 160, the dump lever pivots, toggling it from the first position 177 (FIG. 3(b)) back to the second position 178 (FIG. 3(a)) which disengages the lift and detent point 165 from the dump lock detent 140, releasing the adjustment control 130 and re-engaging the locking mechanism 51. The locking mechanism 51 thereby secures the positioning member 56 and the seat back 13 at the selected position 21.

In another embodiment, the arresting member is a tensioning member and the adjustable feature is a tension limit. The tensioning member includes a means for adjusting the tension on the member that is required to activate the arresting mechanism 70. The action of the positioning member 56 arriving at the selected position tensions the tension member to the adjusted tension limit, shifting the locking mechanism 51 to its engaged state.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A seat adjustment mechanism for pivotably adjusting the position of a seat back relative to a support frame, the seat adjustment mechanism having a recline adjustment state allowing the seat back to be moved relative to the support frame, a dump state biasing the seat back into the support frame, and a fixed state fixing the position of the seat back relative to the support frame at a selected relative position, said seat adjustment mechanism comprising:

a locking mechanism connected to the support frame;

a positioning member coupled between said locking mechanism and the seat back and disposed such that movement of the seat back relative to the seat frame moves said positioning member relative to said locking mechanism;

said locking mechanism including a locking element having an engaged state and a disengaged state, said locking element fixed to said positioning member in said engaged state and allowing said positioning member to move within a plurality of positions relative to said locking mechanism when in said disengaged state, thereby allowing the seat back to move relative to the support frame when said locking mechanism is in said disengaged state;

an arresting mechanism including an arresting member, said arresting mechanism operably coupled to said locking mechanism, said arresting member coupled between said positioning member and said arresting mechanism in a position related to the selected relative position of the seat back and the support frame;

said arresting mechanism having an adjustment state in which said arresting member changes position as said positioning member moves relative to said locking mechanism;

said arresting mechanism having an arresting state in which movement of said arresting member, when the relative position of said positioning member to said locking mechanism is the selected relative position, actuates said arresting mechanism, shifting the seat adjustment mechanism to the fixed state, thereby fixing the relative position of said seat back to the support frame at said selected relative position upon actuation of said arresting mechanism;

said arresting mechanism having a memory state fixing the position of said arresting member;

an adjustment control actuator operably coupled with said locking mechanism and said arresting mechanism, said adjustment control actuator disposed such that movement of said adjustment control actuator selects the recline adjustment state of the seat adjustment mechanism, wherein said locking mechanism is in said disengaged state and said arresting mechanism is in said adjustment state, thereby allowing the seat back to be movable relative to the support frame when said adjustment control actuator is actuated; and a dump actuator operably coupled with said locking mechanism and said arresting mechanism, said dump actuator disposed such that actuation of said dump actuator fixes said locking element in said engaged state and said arresting mechanism in said memory state, thereby allowing the seat back to be movable relative to the support frame until the seat back is moved to the selected relative position of the seat back to the support frame.

2. The seat adjustment mechanism of claim 1, wherein:

said arresting member includes a first and second end, said first end coupled to said positioning member;

said arresting mechanism includes an arresting member adjustment mechanism coupled to said arresting member at one of a plurality of points between said first and second end of said arresting member; and said arresting member adjustment mechanism arranged such that when said arresting mechanism is in said adjustment state, said arresting member adjustment mechanism is capable of movement along said arresting member as said positioning member moves relative to said locking mechanism.

3. The seat adjustment mechanism of claim 2, wherein said arresting member includes a cable.

4. The seat adjustment mechanism of claim 3, wherein said arresting member adjustment mechanism further comprises:

a cable take-up reel coupled to said positioning mechanism, said take-up reel having a rotatable spool coupled to said second end of said arresting cable, and a first portion of said cable being capable of being wound on said spool so that a second portion of said cable extends from said spool to said positioning member.

5. The seat adjustment mechanism of claim 4, wherein said cable take-up reel includes reel locking means selectively locking said rotatable spool.

6. The seat adjustment mechanism of claim 5, further comprising:

a dump lever pivotably coupled to said locking mechanism, said dump lever pivotable to at least a first, second and third position of said dump lever; and wherein said reel locking means includes a key pin coupled to a locking key, said locking key engageably locking said spool; said dump lever arranged to position said key pin and said locking key to unlock said spool in said dump lever third position, and to position said key pin and said locking key to lock said spool in said dump lever first and second position.

7. The seat adjustment mechanism of claim 6, wherein:

said locking mechanism includes an adjustment control having an adjustment shaft pivotably coupled to said locking mechanism, said adjustment control pivotable to at least a first, second and third position of said adjustment control, and said adjustment control further includes a spindle arm attached to said adjustment shaft, and a spindle attached to said spindle arm; and a slave cable coupling said spindle to said locking element and capable of moving said locking element to said disengaged state when said adjustment control is moved to said first position and said third position, and said slave cable capable of moving said locking element to said engaged state when said adjustment control is moved to said adjustment control second position.

8. The seat adjustment mechanism of claim 7, further comprising:

a dump cable coupled to said dump lever and to said spindle, said dump cable coupled to said dump lever and said adjustment control such that pivoting said dump lever from said dump lever second position to said dump lever first position moves said adjustment control from said adjustment control second position to said adjustment control first position; and a dump control actuator coupled to said dump cable and capable of moving said dump cable;

said dump lever associated with said locking mechanism such that when said dump lever is moved to said dump lever first position said dump lever is engaged with said adjustment control spindle arm, fixing said adjustment control in said adjustment control first position, and when moved to said adjustment control second position, said dump lever is disengaged from said adjustment control spindle arm, to free said adjustment control to pivot to said adjustment control second position.

9. The seat adjustment mechanism of claim 8, further comprising:
an adjustment control actuator coupled to said adjustment shaft such that said adjustment control actuator is capable of pivoting said adjustment control to said adjustment control third position; and wherein said adjustment control includes a dump lift disposed such that said adjustment control is capable of pivoting when said adjustment control pivots to said adjustment control third position to pivot to said dump lever-third position.

10. The seat adjustment mechanism of claim 9, wherein:
said dump lever includes a reel mounting flange attached to said dump lever;
said take-up reel includes a housing and a cover, said housing coupled to said mounting flange, said housing and said mounting flange defining a hole, an end of said key pin protruding through said hole, said cover coupled to said housing and enclosing said spool; and
a bias spring operatively associated with said reel cover, said bias spring biasing said locking key to engage and lock said spool, thereby preventing rotation of said spool;
said arresting mechanism including an adjustment plate fixedly coupled to said locking mechanism and having a slot for receiving said end of said key pin, an end of said slot having a ramp contacting and displacing said key pin when said dump lever moves to said dump lever third position, thereby disengaging said locking key from said spool.

11. The seat adjustment mechanism according to claim 10, wherein:
a first end of said dump lever defines a detent point;
said spindle arm of said adjustment control defines a dump lock detent;
said detent point engages said dump lock detent when said dump lever is moved to said dump lever first position and said adjustment control is moved to said adjustment lever first position;
said detent point disengages said dump lock detent when said dump lever pivots to said dump lever second position; and
said positioning member is disposed such that movement to said position related to the selected relative position of the seat back and the support frame causes tension on said arresting cable sufficient to move said cable take-up reel and pivot said dump lever to said dump lever second position and said adjustment control to said adjustment control second position.

12. The seat adjustment mechanism according to claim 11, wherein:
said locking mechanism includes a rod support;
said positioning member includes a rod having an arresting end and an opposite end; said rod slidingly mounted in said rod support, said rod defining a stop at said arresting end of said rod and a flange at said opposite end of said rod, said stop and said flange retaining said rod within said rod support; and
said first cable end is attached to said rod proximate to said arresting end.

13. The seat adjustment mechanism according to claim 12, wherein:
said spool includes an outer wall and at least one rim on said spool guiding and retaining said arresting cable;
said spool includes an inner wall and a hub extending radially inward from said inner wall, said hub including a serrated face defined by at least one side of said hub; and
said locking key defines a serrated face capable of operably engaging and disengaging said serrated hub face, said serrated face preventing rotation of said spool when said locking key is engaged.

14. The seat adjustment mechanism of claim 13, wherein said take-up reel includes a coil spring attached between said spool and said reel housing.

15. The seat adjustment mechanism of claim 14, wherein:
said dump lever includes a U-shaped elongated channel and a pivot mount between a first end and a second end of said channel.

16. The seat adjustment mechanism according to claim 1, wherein:
said arresting mechanism includes a tension member coupled to said positioning member; and
said arresting mechanism is capable of moving in response to tension of said tension member whereby said arresting mechanism moves said locking element to said engaged state when tension of said tension member exceeds a settable limit.

17. A seat adjustment mechanism for positioning a seat back relative to a support frame, comprising:
a locking mechanism connected to the support frame;
a positioning member releasably coupled to said locking mechanism and the seat back such that movement of the seat back relative to the seat frame moves said positioning member relative to said locking mechanism;
an arresting mechanism operably associated with said locking mechanism;
an adjustment control operatively associated with said locking mechanism and said arresting mechanism, said adjustment control positioning the seat back relative to the support frame; and
a dump control operably associated with said locking mechanism and said arresting mechanism, said dump control releasing the seat back to close toward the frame;
said locking mechanism operably associated with said positioning member, said locking mechanism having an engaged position lockingly securing said positioning member and operable when said adjustment control and said dump control are not actuated, said locking mechanism having a disengaged position permitting relative movement between said locking mechanism and said positioning member operable when at least one of said adjustment control and said dump control are actuated;
said arresting mechanism including an arresting member adjustably coupled between said arresting mechanism and said positioning member, said arresting member capable of maintaining a position corresponding to a selected position of the seat back relative to the support frame; said arresting mechanism selectively operable in:
an adjustment state when said adjustment control is actuated in which said adjustment mechanism is capable of moving said adjustable coupling of said arresting member when said positioning member is moved relative to said locking mechanism;

a memory state when said adjustment control is released in which said adjustment mechanism fixes the position of said arresting member; and an arresting state when said dump control is actuated and said adjustment control is released in which said adjustment mechanism retains said locking mechanism in said disengaged position until the movement of the seat back to said selected position relative to the support frame moves said positioning member relative to said arresting mechanism such that said arresting member actuates said arresting mechanism, moving said locking mechanism to said engaged position.

18. A seat adjustment mechanism for adjusting the position of a seat back relative to a support frame, comprising:

a master locking mechanism adapted to be supported by a first side of the frame;

a master positioning rod including a first end coupled to a first side of the seat back, and a second end releasably coupled to said master locking mechanism, said master positioning rod capable of moving relative to said master locking mechanism, when said master locking mechanism is released;

a slave locking mechanism adapted to be supported by a second side of the frame;

a slave positioning rod including a first end coupled to a second side of the seat back, and a second end releasably coupled to said slave locking mechanism;

said slave locking mechanism operably coupled to said master locking mechanism such that said slave positioning rod is capable of moving relative to said slave locking mechanism when said master locking mechanism is released;

a dump lever operably coupled to said master locking mechanism;

an arresting mechanism operably coupled to said dump lever, said arresting mechanism including an arresting member having an adjustable portion coupled between said arresting mechanism and said second end of said master positioning rod;

an adjustment control coupled to said master locking mechanism and operably associated with said dump lever such that movement of said adjustment control releases said master and slave locking mechanisms whereby said master and slave positioning rods are capable of moving relative to said locking mechanisms, and movement of said adjustment control moves said dump lever to uncouple said arresting mechanism from said arresting member whereby movement of said master positioning rod relative to said master locking mechanism varies the length of said adjustable portion; and a dump control operably associated with said adjustment control and said dump lever, such that movement of said dump control moves said adjustment control, releasing said master and said slave locking mechanisms and moving said dump lever to fix said adjustment control, thereby holding said master and slave locking mechanisms in a released state until movement of said master position rod to a position determined by said adjustable portion of said arresting member moves said arresting member and said arresting mechanism, moving said dump lever and said adjustment control, thereby re-coupling said master locking mechanism to said master positioning rod and said slave locking mechanism to said slave positioning rod.

19. A seat adjustment mechanism for adjusting a selected relative position of a seat back to a support frame, comprising:

a locking mechanism;

a positioning rod coupled between said locking mechanism and the seat back and disposed such that movement of the seat back relative to the support frame moves said positioning rod relative to said locking mechanism;

a take-up reel coupled to said locking mechanism and including a reel housing, a reel cover, a spool and a spool spring, said housing defining a hole, said housing and said cover cooperating to enclose said spool and said spool spring;

said spool having a serrated hub face defining a hole;

an arresting cable having a first end coupled to said positioning rod, said arresting cable having a second end coupled to said spool, said spool spring cooperatively coupled with said reel housing and said spool to allow for winding a portion of said arresting cable upon said spool, length of said portion related to the selected relative position of the seat back to the support frame;

a reel lock including a locking key, said locking key including a pin and a serrated face engageable to said serrated hub face of said spool, said pin protruding through said holes defined by said spool and said reel housing;

said reel lock including a key bias spring cooperatively coupled between said locking key and said reel cover, said spring capable of moving said serrated face of said locking key into engagement with said serrated hub face of said spool, thereby fixing said spool;

a plate connected to said locking mechanism, said plate defining an arcuate slot and an arcuate ramp at an end of said arcuate slot, said slot capable of receiving said pin, and said pin capable of movement along said arcuate ramp; and an adjustment control operably coupled to said take-up reel and capable of moving said reel relative to said plate, whereby said pin contacting said ramp disengages said locking key from said spool, allowing said spool to rotate and said arresting cable to be wound or unwound from said spool.

* * * * *